Sept. 5, 1967  T. J. SWEENEY  3,340,379
METHOD OF WELDING BUTTON THROUGH PAINT
Filed Sept. 24, 1963
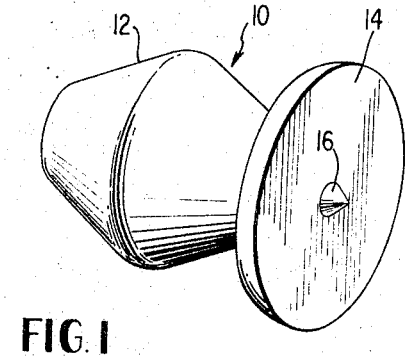
FIG.1
FIG.5
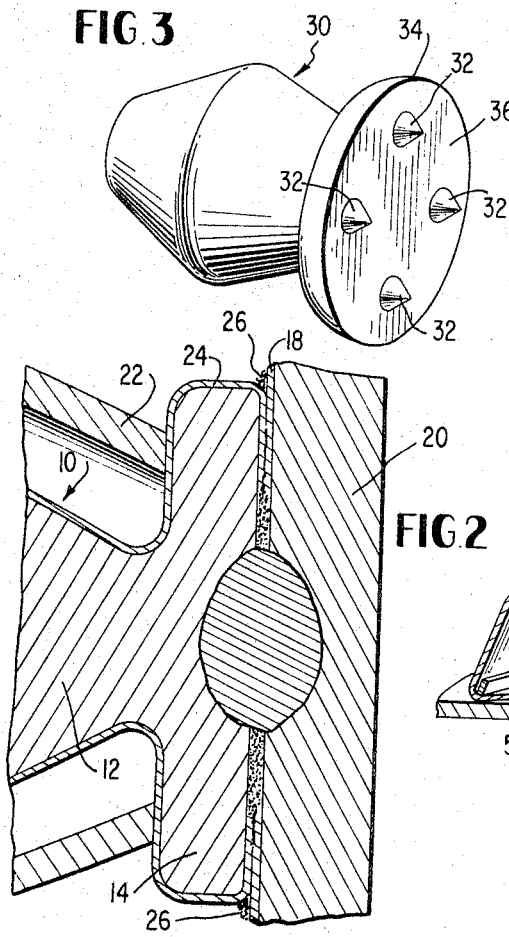
FIG.3
FIG.2
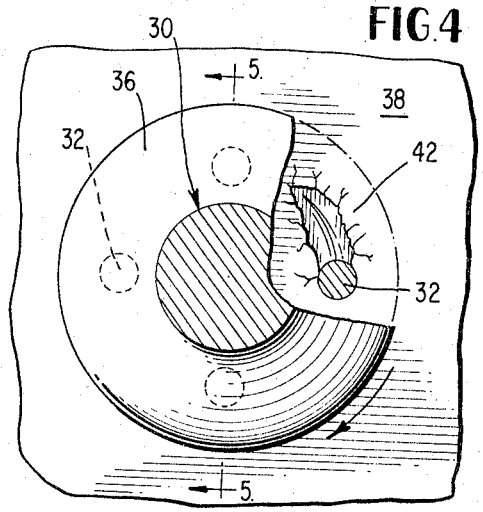
FIG.4
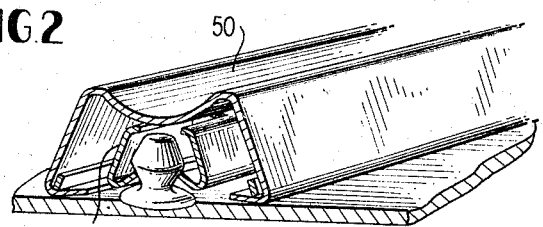
FIG.6
INVENTOR
THEODORE J. SWEENEY
BY Burton & Parker
ATTORNEYS

United States Patent Office 3,340,379
Patented Sept. 5, 1967

3,340,379
METHOD OF WELDING BUTTON THROUGH PAINT
Theodore J. Sweeney, Grosse Pointe, Mich., assignor to Chicago United Products Company, Inc., Detroit, Mich., a corporation of Michigan
Filed Sept. 24, 1963, Ser. No. 311,110
4 Claims. (Cl. 219—99)

ABSTRACT OF THE DISCLOSURE

A method of attaching a metal button to a metal panel coated with electrically non-conducting material, in which the button base face has one or more sharp projections which penetrate (with or without scraping movement) the coating layer to make metal-to-metal contact with the panel for striking an arc upon withdrawal of the button to initiate a flash-welding operation. The button base face may be coated with a weld-through primer and sealer. The current is preferably so controlled that the coating is destroyed only in areas to be covered by the button base.

---

This invention relates to a method of attaching a trim strip to an automobile body component such as a door or a fender through the use of a button welded to a coated component followed by the attachment of a trim strip through utilization, if necessary, of an adapter for connecting the strip to the button.

In the mass production of automobiles, it is believed advantageous to determine trim strip location toward the end of the assembly process. In this manner the many different models which must be scheduled can be more accurately forecast and final production more closely geared to the need. Therefore, the method of this invention is directed to the assembly of trim strips on automobiles and automobile components after they have been painted. Advantages are obtained not only with respect to the complete assembly of an automobile but also with respect to the manufacture and warehousing of components such as doors, since a single type door is often used on many models, the only distinction being in the type and location of trim strips on the door.

More specifically, the method of my invention involves the welding of a button about the size of a pea to a painted or coated panel, the button having a projection extending from its base which pierces the paint and establishes an electrically conductive panel area. Through well known stud welding techniques, an electrical welding arc is produced and the button is withdrawn from the panel thereby producing molten metal and causing further destruction of the paint at the pierced area. The button is then pressed into engagement with the panel to form a sound weld. Following this a trim strip is snapped on the button through the use of an adapter, if required.

Preferably a weld-through primer and sealer is used to facilitate the welding operation and to provide a seal at the periphery of the base of the button to inhibit corrosion. A suitable weld-through primer and sealer may be of the type disclosed and referred to in the Sussenbach Patent No. 2,452,805.

The button is small; in fact, somewhat miniature in size in comparison to previously employed fasteners in the automobile trim field. A suitable size presently used in automobile manufacture involves a button .200 inch in diameter at its head and base and .160 inch high, the shank of the button being less than one half the diameter of the head. Utilization of this new concept of trim attachment in the automobile field provides substantial economies and advantages in the manufacturing and warehousing of doors, fenders and the like. Similar economies and advantages are attainable in many other fields, such as home appliances, refrigerators, stoves and the like. Business and electronic equipment offer other areas of commercial development.

The instant invention will be discussed in the context of an automobile trim strip.

Other objects, advantages and meritorious features will more fully appear from the following specifications, claims and accompanying drawings wherein:

FIG. 1 is a perspective view of a button;
FIG. 2 is a side cross sectional view of the base of the button of FIG. 1, the button having been coated with a weld-through primer and sealer and stud welded to a painted panel;
FIG. 3 is a perspective view of a button having a plurality of projections;
FIG. 4 is a plan view with the head of the button of FIG. 3 cut away and a portion of the base cut away showing the effect of one of the projections on the paint of a panel when the button is rotated prior to the welding operation;
FIG. 5 is a side cross sectional view taken on line 5—5 of FIG. 4 after the welding operation;
FIG. 6 is a perspective view in cross section showing a trim strip with adapter mounted on a welded button.

Referring now to FIGS. 1 and 2, it will be seen that button 10 has a head 12 and a base 14, a coat removing means 16 projecting from the flat base 14. In the embodiment shown, the coat removing means 16 is a representation of a burr projection remaining on the pea size button 10 after the button is cut by automatic machinery from the rod from which it is formed. The projection may be also produced by actually forming a conical projection. The button is metal and its projection 16 extends centrally from the flat circular base 14 whereby upon engagement of the projection with the paint 18 of panel 20 in FIG. 2 the point will pierce the paint 18 and make contact with the metal of the panel. Once the paint is pierced, pressure being applied through use of a standard stud welding gun 22, partially shown, the normal stud welding operation takes place, that is, an electrical welding arc is formed between the button and the electrically conductive panel area and the button is withdrawn while maintaining this arc to form molten pools of metal at the button and the panel after which the button is pressed home into the panel to accomplish the weld. Stud welding guns capable of accomplishing this button withdrawal and return are well known, examples being found in U.S. Patent Nos. 2,260,969 and 2,315,502. It will be recognized that the arc once struck will accomplish destruction of the paint around the pierced section and will enable the production of a sound weld at the central portion of the button.

As seen in FIG. 2, the button is covered with a weld-through primer and sealer coat 24 which aids in the production of a sound weld and also forms a seal 26 around the periphery of the circular base. This seal is particularly important in that it inhibits corrosion between the button and the panel where the integrity of the paint has been destroyed. Accurate control of the degree of paint destruction can be accomplished through suitable setting of the welding gun.

Referring now to FIGS. 3–5, it will be seen that the button 30 of FIG. 3 includes a plurality of coat removing means 32, these being shown as four cone-like projections arranged in an annular ring positioned internally of the periphery 34 of the circular base 36. Upon engagement of the button 30 with the coated metal panel 38 the welding gun 40 accomplishes a rotation of the button 30 to cause the projections 32 to pierce and scrape the paint 42 in the manner shown in FIG. 4. With the four projections shown, a rotation of about 90° will produce an electrically conductive panel ring which will support an electric welding arc. Upon withdrawal and return of the button an annular weld is formed. Control of the welding gun can maintain the paint destruction to an area within the confines of the periphery 34 of the circular button base so that corrosion problems are minimized. As noted in FIG. 5, the donut-like weld is formed with the paint layer 42 maintaining its integrity at a location around the rim or periphery 34 of the base.

As discussed with respect to the button of FIGS. 1–2, a weld-through primer may also be used in the method discused for FIGS. 3–5. The weld-through primer can be applied by coating the button base when the button is manufactured or just prior to engagement with the panel. Magazine delivery of buttons to a welding gun can be implemented by a spray nozzle which coats the base of the button just prior to its engagement with the panel. A dip technique may also be used.

It is to be noted that relative movement is produced between the coat removing means and panel of FIG. 5, this relative movement being a rotational movement. Sliding relative movement of any kind under proper conditions may also be satisfactory.

The coat removing means may of course take various forms, those shown here being regular in orientation. Irregular serrations and the like may also be employed.

After the button of FIG. 1 or FIG. 3 has been welded to the metal panel, the trim strip 50 (FIG. 6) is assembled thereon, it being recognized that on a normal automobile component there will be a series of buttons welded to the panel, preferably through a gang welding operation. These buttons will be oriented in a predetermined alignment to receive a trim strip such as shown in FIG. 6 wherein the trim strip is equipped with an adapter 52 which interconnects the strip with the button.

It is believed it will be recognized that the many colors and trim strip combinations required for the many models sold to satisfy the purchasing public present a difficult planning and scheduling problem. The method of this invention enables a more realistic and responsive decision in that it can be made at a time closer to the actual delivery date of the automobile. Further, it will be recognized that repair work on automobiles is facilitated with the use of this invention.

What is claimed is:

1. The method of attaching a metal button to a coated metal panel wherein the button is provided with a coat-removing means on the face thereof to be secured to the panel, which method comprises, engaging the button face having said coat-removing means with the coated metal panel, producing relative movement between the button and the panel to cause said coat-removing means to penetrate the panel coat and establish metal-to-metal contact between the coat-removing means and the panel and to provide an electrically conductive path therebetween, passing electric current through said electrically conductive path, withdrawing the button from the panel while maintaining said electric current passage to strike an electric arc between the button and the panel of sufficient intensity to destroy said panel coating and to form a molten pool of metal on said button face and on the metal panel, and pressing the molten face of the button against the molten area of the metal panel to weld the button to the panel.

2. The method defined in claim 1 including the step of coating the face of the button to be welded to the panel with a weld-through primer and sealer prior to engaging said button face with the coated metal panel whereby a corrosion-inhibiting seal is produced around the final welded joint.

3. The method defined in claim 1 wherein said coat-removing means on the button face includes a plurality of sharp projections and wherein the step of producing relative movement includes sliding movement to scrape the coating for establishing said metal-to-metal contact.

4. The method defined in claim 1 including controlling the intensity of said electric current passage to confine the destruction of said panel coating to an area less than the area of said button face to be secured to the panel, thereby providing a continuous panel coating around the joint formed between the button face and the panel upon completion of the weld.

References Cited

UNITED STATES PATENTS

| | | | |
|---|---|---|---|
| 1,995,001 | 3/1935 | Ito | 219—98 |
| 2,510,620 | 6/1950 | Craven | 219—98 |
| 2,845,522 | 7/1958 | Hall | 219—93 |
| 3,233,073 | 2/1966 | Ruetschi | 219—93 |

RICHARD M. WOOD, *Primary Examiner.*

R. F. STAUBLY, *Assistant Examiner.*